March 5, 1968 W. W. WILSON ET AL 3,371,437
LOCKING DEVICE FOR DIGGER TOOTH
Filed April 28, 1965 2 Sheets-Sheet 1
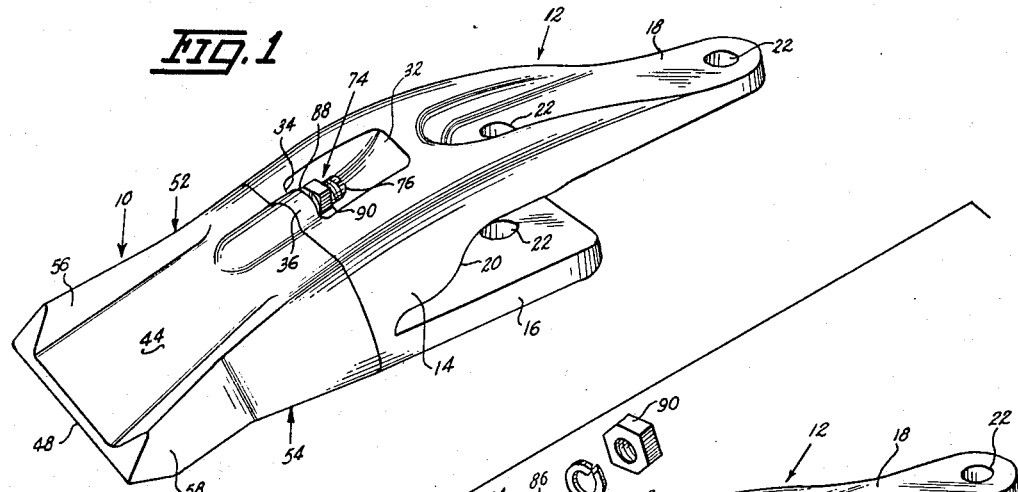
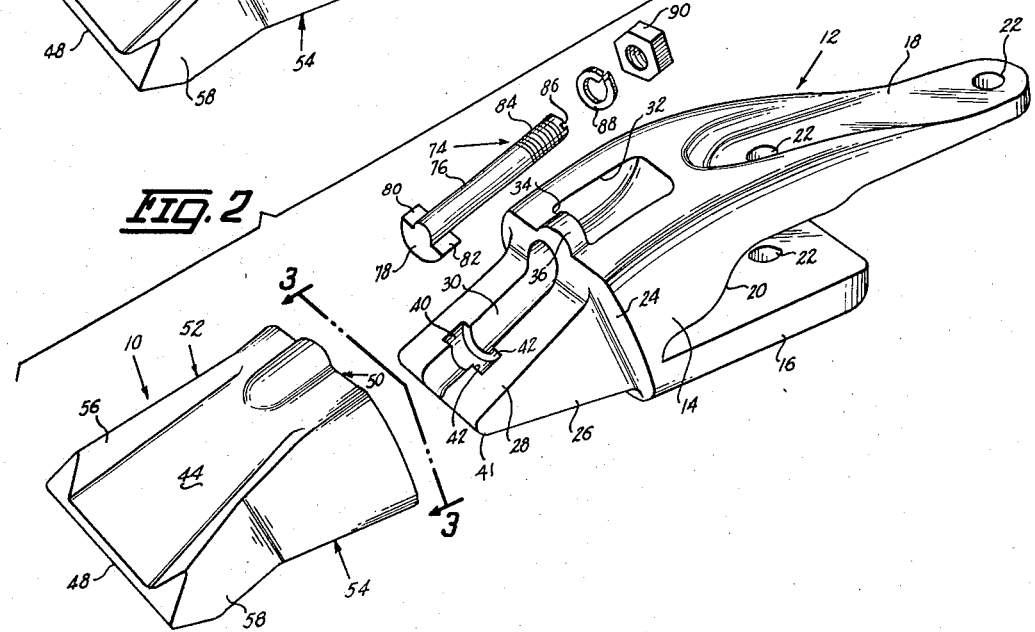
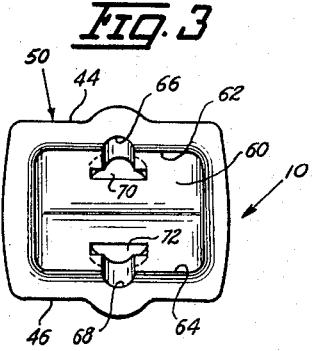
INVENTORS.
WILLIAM W. WILSON
ROBERT DOUGLAS LAFITTE
BY
ATTORNEY.

March 5, 1968 W. W. WILSON ET AL 3,371,437
LOCKING DEVICE FOR DIGGER TOOTH
Filed April 28, 1965 2 Sheets-Sheet 2
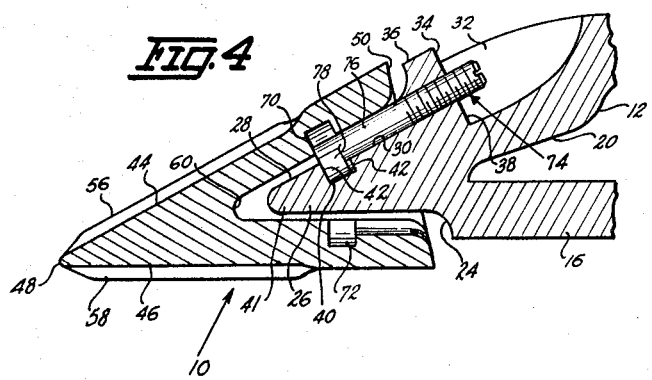
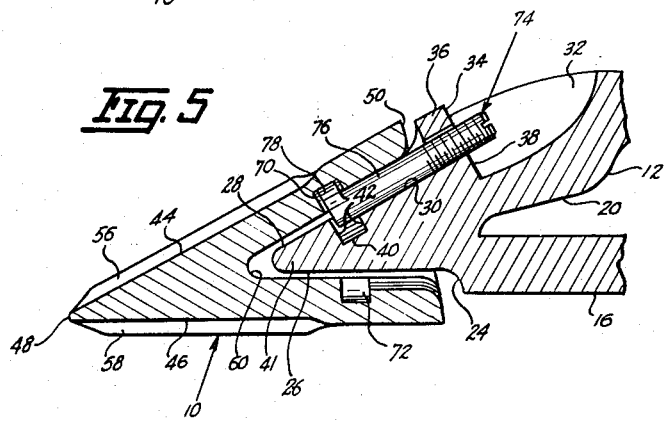
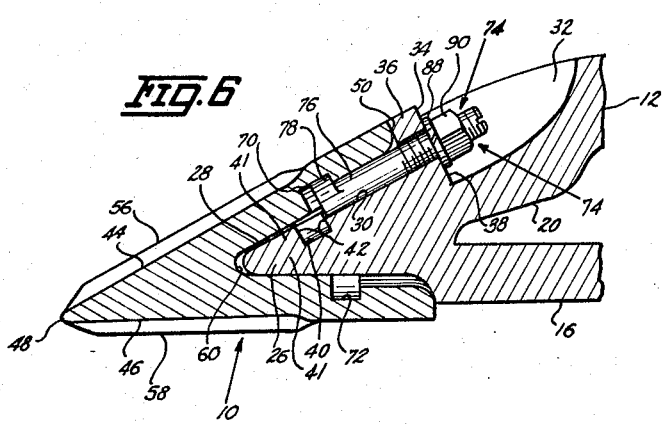
INVENTORS.
WILLIAM W. WILSON
ROBERT DOUGLAS LA FITTE
BY
ATTORNEY.

United States Patent Office 3,371,437
Patented Mar. 5, 1968

3,371,437
LOCKING DEVICE FOR DIGGER TOOTH
William W. Wilson and Robert D. La Fitte, Shreveport, La., assignors to Mid-Continent Steel Casting Corporation, Shreveport, La., a corporation of Louisiana
Filed Apr. 28, 1965, Ser. No. 451,406
4 Claims. (Cl. 37—142)

ABSTRACT OF THE DISCLOSURE

A locking device in the form of a bolt with a half round head for securing a removable digger tooth point to a supporting shank. The bolt is disposed in the shank interiorly of the assembled tooth point and shank with the head rotatable from nesting engagement in a socket in the shank to nesting engagement in a registering socket in the tooth point and the point and shank are secured together by the bolt after moving the sockets out of register.

---

This invention relates to a digger tooth of the type employed with excavating apparatus such as drag lines, power shovels, clam diggers, back hoes and the like.

Digger teeth, as is well known, are subjected to severe abrasive wear requiring their replacement from time to time and for this purpose it is desirable not only that the tooth be susceptible of easy attachment to and removal from a supporting shank but that it be securely affixed to the shank under working conditions. Many devices for locking a tooth to a shank have been devised but they are frequently difficult to manipulate and are themselves often subjected to wear so that breakage occurs and the tooth is sometimes lost.

It is accordingly one of the important objects of this invention to provide a new and improved locking device for securing a digger tooth to a supporting shank.

Another object contemplated herein is the provision of a locking device for a digger tooth that is concealed within the tooth and supporting shank where it is not subject to abrasion from the material being worked upon and where possibilities of breakage are eliminated for all practical purposes.

Further objects include the provision of a locking device as characterized which is simple and easy to operate; is reliable and efficient in operation, and which permits a tooth to be replaced in a relatively short time and with little effort.

To attain these objects and such further objects as may appear herein, or be hereinafter pointed out, reference is made to the accompanying drawings forming a part hereof, in which:

FIG. 1 is a perspective view illustrating a preferred embodiment of this invention, FIG. 2 is an exploded view of the device shown in FIG. 1 to more clearly show the construction thereof, FIG. 3 is a rear view of the tooth element of this invention taken from the line 3—3 of FIG. 2, and FIGS. 4, 5 and 6 are each longitudinal section views of the tooth and a portion of the shank illustrating progressive steps in the mounting of the tooth to the shank and the operation of the locking means relative thereto.

Referring to the drawings, the tooth member is represented by the numeral 10 and the shank member is identified by the numeral 12 as best seen in FIG. 2. In general, it will be understood that shank 12 will be secured to a support in the form of a piece of excavating equipment as referred to above (but not shown) and that the tooth 10 is removably attached to such shank. In this regard, this invention is directed more particularly to an improved locking means by which the tooth and shank are joined together.

Shank 12 includes a body 14 that may be designed in any suitable manner to conform to the configuration of that portion of any excavating equipment to which it will be attached and for purposes of illustration, body 14 here is shown with the flat base 16 and the integral vertically spaced arm 18 which overhangs the base 16 as seen in FIGS. 1 and 2. The underside 20 of arm 18 may be of irregular shape as desired or required for the purposes indicated and holes 22 in arm 18 and base 16 are provided to receive bolts or rivets (not shown) in a well known manner by which the shank 12 may be securely affixed to any selected piece of excavating apparatus.

The body portion 14 of shank 12 includes the forward face 24 from which there is projected the integral wedge shape nose 26 which has, for reference purposes, the top side 28. A groove 30 is formed longitudinally in side 28 and extends through face 24 into a relatively large recess 32 formed in the top central portion of body 14. The forward edge 34 of recess 32 is spaced rearwardly from face 24 to form the wall section 36 between groove 30 and recess 32 and as seen in FIGS. 4–6, the depth of recess 32 extends below the plane of groove 30 and thus defines a rear face 38 for wall 36. Also on side 28 of nose 26 there is a socket or recess 40 disposed transversely of and intersecting groove 30 as seen in FIG. 2 and preferably at a point closer to the forward end 41 of nose 26 than to face 24. The exact location of socket 40 can be varied as long as it is reasonably spaced forwardly of face 24 for reasons that will become apparent. The socket 40 defines a curved path into nose 26, across groove 30 and extends below the plane of such groove to form the shoulders 42.

The tooth 10 is wedge-shaped in design and preferably we have made it symmetrical with the respective like flat surfaces 44 and 46 diverging from the cutting edge 48 to their rearward edge 50. The respective side edges 52 and 54 contiguous with surfaces 44 and 46 flare outwardly towards edge 48 and such side edges further define the respective flanges 56 and 58 which extend upwardly and/or downwardly relative to surfaces 44 and 46 depending upon their relative position when in use. The rearward portion of tooth 10 opposite to the cutting edge 48 is provided with a recess 60 which conforms to the configuration of the nose portion 26 on shank 12 and is designed for nesting engagement as will appear.

As seen in FIG. 3, the opposed walls 62 and 64 represent the respective under sides of tooth surfaces 44 and 46 and such walls are each provided with the like opposed grooves 66 and 68 that extend inwardly into recess 60 and terminate in the respective transverse wells on sockets 70 and 72. The radius of grooves 66 and 68 is the same as for groove 30 in nose 26 and the shape of sockets 70 and 72 is similar to that of sicket 40. Only one of the grooves and sockets in recess 60 will be used at any one time as will appear but the two sets are shown to illustrate the fact that tooth 10 may be mounted to nose 26 with either side 44 or 46 serving as the top side of the assembled unit. It is also pointed out that the length of grooves 66 and 68 from the rear tooth edge 50 to the respective sockets 70 and 72 is less than the distance between socket 40 and face 24 for purposes that will later become apparent.

A bolt assembly 74 (FIG. 2) includes a bolt 76 having a head 78 on one end that defines a half circle or segment so as to provide the opposed shoulders 80 and 82. The other end portion of bolt 76 is threaded as at 84 and the adjacent bolt end is provided with a kerf 86. Numerals 88 and 90 represent a lock washer and nut respectively.

In the use of this invention, it will be understood, as indicated above, that shank 12 will be suitably attached to any piece of excavating equipment with which it is to be used and in this position, tooth 10 is attached to shank 12 as follows. Bolt 76 is placed in groove 30 of nose 26 so that the arcuate portion of bolt head 78 nests in socket 40 intermediate shoulders 42, and the kerfed end 86 of the bolt 76 extends through wall 36 into recess 32. In this position, shoulders 80 and 82 on bolt head 78 will be substantially flush with the top side 28 of nose 26. The recess portion 60 of tooth 10 with groove 66 (or 68) in juxtaposition to groove 30 is then introduced partially onto nose 26 for nesting engagement therewith until either socket 70 or 72 (whichever side is used) is in register with socket 40 and in this position since grooves 66 and 68 are shorter than the distance from socket 40 to face 24, the rear edge 50 of tooth 10 will be spaced forwardly of face 24 as seen in FIG. 4. Bolt 76 is then rotated about its longitudinal axis 180°, which may be accomplished by a screwdriver applied to kerf 86, until the arcuate portion of bolt head 78 passes out of socket 40 into nesting engagement with either socket 70 or 72 as seen in FIG. 5. Tooth 10 can then be pushed further onto nose 26 until edge 50 abuts face 24 and the washer 88 and nut 90 can be applied to the threaded end 84 of bolt 76 and tightened. During this operation, shoulders 80 and 82 of the bolt head 78 will have moved past socket 40 toward face 24 and will now be in abutting engagement with the top 28 adjacent slot 30 so that they effectively lock the bolt against any rotation as can be seen best in FIG. 6. Thus assembled, tooth 10 and shank 12 are securely attached together by a straight bolt which is inside of the parts so secured so that such bolt is free from any wear. Such an arrangement provides great strength in the locking means and minimizes, if not eliminates, bolt breakage and the loss of tooth 10 as so frequently occurs in other devices. To remove the tooth 10 from shank 12, the assembly procedure outlined is merely reversed.

It should be pointed out that the effectiveness of bolt 76 can be accomplished without the use of socket 40 in nose 26 although such socket facilitates the use of the bolt as described. Without socket 40, tooth 10 can be secured to shank 12 easily by inverting side 28 of nose 26 and first placing the bolt 76 in the appropriate groove and socket within recess 60. However, the assembly of parts 10 and 12 with side 28 up is preferred as described. Likewise, by making groove 30 deep enough to fully receive bolt 78, the grooves 66 and 68 in tooth 10 can be eliminated since sockets 70 and 72, when engaged by bolt head 78, will provide adequate locking engagement of the tooth 10 when the washer 88 and nut 90 are applied as described.

From the foregoing, it is thought a full understanding of the construction and operation of this invention will be had and the advantages of the same will be appreciated.

It will be understood that the phraseology employed herein is for the purpose of description and not for limitation and that modifications and changes can be made within the scope of what is claimed, without departing from the spirit and purpose thereof.

I claim:

1. In a locking device for a digger tooth, the combination of:

a shank having a body member, means on said body member for attaching the same to a support, a face on said body member, a nose projecting from said face, said body member being provided with a recess spaced from said face, said nose being provided with a groove extending through said face into said recess, said nose being provided with a socket transversely of and intersecting said groove, a tooth member provided with a recess complementary in shape to said nose, one of the walls of said recess in said tooth member having a groove extending from the open end of said recess inwardly and terminating in a transversely disposed socket, a bolt with a half round head segment, said bolt disposed in said groove in said nose with said head segment nested in the socket of said nose and the other end of said bolt extending through said face into the recess in said body member, said tooth member nested on said nose so that the socket therein registers with the socket in said nose with said bolt also disposed in the groove in said tooth member and the recessed end of said tooth member is spaced from said face, said bolt being rotated to move said head segment into the socket in said tooth member so said tooth member can be moved into engagement with said face and said head segment is out of register with the socket in said nose, and means for locking said bolt within the recess in said body member to securely hold said tooth member on said nose.

2. In locking device for a digger tooth, the combination of:

a shank having a body member, means on one end of said body member for attachment to a support, a nose projecting from the opposite end of said body member, a tooth provided with a recess for nesting engagement with said nose, the recess in said tooth and said nose being provided with complementary slots, each of said slots being provided with a transverse socket, a bolt with a head, said bolt disposed in the slot in said nose with the head in the socket in said nose, introduction of said tooth partially onto said nose placing said sockets and said slots in register so that said bolt is also disposed in the slot in said tooth, said bolt being rotated to position said head in the socket in said tooth to permit a further introduction of said tooth onto said nose and correspondingly move said sockets out of register so that portions of said head extends transversely of said slot in said nose, and means for securing said bolt to said body member.

3. In a locking device for a digger tooth, the combination of:

a shank having a body member, means on said body member for attaching the same to a support, a nose projecting from said body member, said body member being provided with a first recess, a tooth provided with a second recess complementary in shape to said nose, said nose being provided with a groove in communication with said first recess, said nose being provided with a first socket transversely of and intersecting said groove, one wall of said second recess being provided with a second socket, a bolt with a half round head segment, said tooth nested on said nose so that said first and second sockets are in register, said bolt being journalled in said groove so as to extend at one end into said first recess and with its head at the other end nested in said first socket, said bolt being rotated to nest said head in said second socket, said tooth movable relative to said nose to move said sockets out of register, and means in said first recess for securing said bolt means to said body member.

4. In a locking device for a digger tooth, the combination of:

a shank having a body member,
means on said body member for attaching the same to a support,
a nose projecting from said body member,
said body member being provided with a first recess,
a tooth provided with a second recess complementary in shape to said nose,
said nose being provided with a groove in communication with said first recess,
said nose being provided with a first socket transversely of and intersecting said groove,
the interior wall of said tooth defining said second recess being provided with a second socket,
a bolt with a half round head segment,
said bolt being disposed in said groove so as to extend at one end into said first recess and with its head at the other end nested in said first socket,
introduction of said tooth partially onto said nose placing said first and second sockets in register,
said bolt being rotated to remove said bolt head from said first socket and cause it to nest in said second socket,
further introduction of said tooth onto said nose acting to move said first and second sockets out of register so that portions of said bolt head extends transversely of said groove and is prevented thereby from further rotation, and
means in said first recess for securing said bolt means to said body member.

References Cited
UNITED STATES PATENTS

| | | | |
|---|---|---|---|
| 1,092,847 | 4/1914 | Millspaugh | 292—256.73 |
| 1,485,879 | 3/1924 | Page | 37—142 |
| 1,595,112 | 8/1926 | Mentzer | 172—753 |

ABRAHAM G. STONE, *Primary Examiner.*

R. CARTER, A. E. KOPECKI, *Assistant Examiners.*